(12) United States Patent
Cheng et al.

(10) Patent No.: US 11,061,493 B1
(45) Date of Patent: Jul. 13, 2021

(54) MOUSE ROLLER MODULE

(71) Applicant: Primax Electronics Ltd., Taipei (TW)

(72) Inventors: Li-Kuei Cheng, Taipei (TW);
Yung-Ming Tsai, Taipei (TW);
Chun-Che Wu, Taipei (TW)

(73) Assignee: PRIMAX ELECTRONICS LTD.,
Taipei (TW)

( * ) Notice: Subject to any disclaimer, the term of this patent is extended or adjusted under 35 U.S.C. 154(b) by 0 days.

(21) Appl. No.: 16/911,230

(22) Filed: Jun. 24, 2020

(30) Foreign Application Priority Data

Apr. 30, 2020 (TW) ................................ 109114592

(51) Int. Cl.
*G06F 3/0362* (2013.01)
*G06F 3/038* (2013.01)
*G06F 3/0354* (2013.01)

(52) U.S. Cl.
CPC ............ *G06F 3/0362* (2013.01); *G06F 3/038* (2013.01); *G06F 3/03543* (2013.01)

(58) Field of Classification Search
CPC ..... G06F 3/0363; G06F 3/03543; G06F 3/038
See application file for complete search history.

(56) References Cited

U.S. PATENT DOCUMENTS

| | | | | |
|---|---|---|---|---|
| 2006/0001657 A1* | 1/2006 | Monney | ................ | G06F 3/0312 345/184 |
| 2006/0108999 A1* | 5/2006 | Lee | ........................ | G06F 3/0362 324/207.2 |
| 2007/0188454 A1* | 8/2007 | O'Sullivan | .............. | G09G 5/08 345/163 |
| 2008/0100577 A1* | 5/2008 | Sutardja | ................ | G06F 3/0312 345/166 |
| 2019/0121452 A1* | 4/2019 | Hsueh | ................. | G06F 3/03543 |

\* cited by examiner

*Primary Examiner* — Ariel A Balaoing
(74) *Attorney, Agent, or Firm* — Kirton McConkie; Evan R. Witt

(57) ABSTRACT

A mouse roller module includes a roller assembly, a sensing unit and a control unit. The roller assembly includes a stator and a rotator. When the roller assembly is in a first usage mode, the rotator is rotated relative to the stator in response to an applied force of a user. A rotating speed of the rotator relative to the stator is sensed by the sensing unit. If the rotating speed of the rotator relative to the stator reaches a threshold value when the roller assembly is in the first usage mode, the roller assembly is switched form the first usage mode to a second usage mode under control of the control unit. While the first usage mode is switched to the second usage mode, the roller assembly is switched to an enabled state, so that the stator drives rotation of the rotator.

7 Claims, 4 Drawing Sheets

MOUSE ROLLER MODULE

FIELD OF THE INVENTION

The present invention relates to a mouse roller module, and more particularly to a mouse roller module with a driving motor.

BACKGROUND OF THE INVENTION

A mouse is used to control a cursor on a computer screen in order to operate the computer. Since 1968, the United States has produced the world's first mouse. After then, the mouse is applied to paper processing operations, video games, industrial drawings, drawing design or media production. Consequently, the mouse has become an indispensable part of the computer system. In the early stage, the mouse uses a trackball to detect the displacement of the mouse. With increasing development of science and technology, an optical module or a laser module is used to detect the displacement of the mouse in order to enhance the working efficiency. Moreover, for increasing the functionality and convenience of the mouse, the earliest wired single-button mouse is gradually evolved into the modern wireless multi-button roller mouse. For complying with different industrial needs or personal preferences, various electronic manufacturers have begun to create a variety of mouse devices with different shapes in order to meet the operation requirements of different users. Consequently, people pay much attention to the comfort and sensitivity of pressing or operating the mouse button (e.g., the left button, the right button or the middle button).

However, the use of conventional mouse still has some drawbacks. For example, while the user plays an electronic game, it is necessary to continuously rotate the roller to operate the characters or selective items in the game. Alternatively, if the user intends to search data quickly from a great amount of data of the viewed document on the display screen, the user also has to continuously rotate the roller to scroll the document data on the display screen. Since the roller has to be continuously rotated with the user's finger in the above situations, the conventional mouse is not user-friendly. Therefore, there is a need of providing an improved mouse roller module so as to solve the drawbacks of the conventional technologies.

SUMMARY OF THE INVENTION

The present invention provides a mouse roller module. A roller assembly of the mouse roller module includes a stator and a rotator. In a fast rotation usage mode, the roller assembly is automatically switched to an enabled state. Consequently, the stator drives the rotation of the rotator.

The other objects and advantages of the present invention will be understood from the disclosed technical features.

In accordance with an aspect of the present invention, a mouse roller module is provided. The mouse roller module includes a roller assembly, a sensing unit and a control unit. The roller assembly includes a stator and a rotator. The stator is covered by the rotator. When the roller assembly is in a first usage mode, the rotator is rotated relative to the stator in response to an applied force of a user. The sensing unit is located beside the roller assembly. A rotating speed of the rotator relative to the stator is sensed by the sensing unit. The control unit is electrically connected with the roller assembly and the sensing unit. If the rotating speed of the rotator relative to the stator reaches a threshold value when the roller assembly is in the first usage mode, the roller assembly is switched form the first usage mode to a second usage mode under control of the control unit. While the first usage mode is switched to the second usage mode, the roller assembly is switched from a disabled state to an enabled state, so that the stator drives rotation of the rotator.

If the rotating speed of the rotator relative to the stator is lower than the threshold value when the roller assembly is in the second usage mode, the roller assembly is switched form the second usage mode to the first usage mode under control of the control unit. While the second usage mode is switched to the first usage mode, the roller assembly is switched from the enabled state to the disabled state.

In an embodiment, the rotator of the roller assembly includes an accommodation structure, a rotating shaft and plural permanent magnets, and the accommodation structure includes a bottom wall and a lateral wall, which are connected with each other. The rotating shaft is installed on the bottom wall, the plural permanent magnets are discretely arranged and distributed on an inner surface of the lateral wall. The plural permanent magnets are arranged around the rotating shaft.

In an embodiment, the stator of the roller assembly includes a housing, a first bearing and a second bearing. The housing includes a first opening and a second opening. The first opening and the second opening are opposed to each other. The first opening is disposed within the accommodation structure of the rotator. The second opening is located outside the accommodation structure of the rotator. The first opening is arranged between the bottom wall of the accommodation structure and the second opening. The first bearing is located at the first opening. The second bearing is located at the second opening. The rotating shaft of the roller assembly is penetrated through the first bearing, the housing and the second bearing sequentially.

In an embodiment, the stator further includes a permeability structure, and the permeability structure is circumferentially arranged on an outer surface of the housing and disposed within the accommodation structure of the rotator. The permeability structure includes plural permeability units and plural coil units. The plural permeability units are extended toward the lateral wall of the accommodation structure and aligned with the corresponding permanent magnets. The plural coil units are wound around the corresponding permeability units.

In an embodiment, each permeability unit has a permeability surface that faces the corresponding permanent magnet.

In an embodiment, the permeability units of the permeability structure are made of silicon steel.

In an embodiment, the sensing unit is a Hall sensor.

In an embodiment, the mouse roller module further includes a circuit board. The circuit board is installed on the stator of the roller assembly. The stator is arranged between the rotator and the circuit board. The sensing unit and the control unit are installed on the circuit board.

From the above descriptions, the present invention provides the mouse roller module. The roller assembly is an outer rotator motor composed of the stator and the rotator. When the roller assembly is in a first usage mode, the rotator is rotated relative to the stator in response to the applied force of the user and the rotating speed of the rotator relative to the stator is sensed by the sensing unit. If the rotating speed of the rotator relative to the stator reaches a threshold value, the roller assembly is switched form the first usage mode to a second usage mode under control of the control unit. While the first usage mode is switched to the second usage mode, the roller assembly is switched from a disabled state to an enabled state, so that the stator drives the rotation of the rotator. Moreover, since the permanent magnets of the rotator and the corresponding permeability units of the stator face each other, the rotation of the roller assembly results in clear intermittent rotation feel. In other words, the operating feed of rotating the roller assembly is enhanced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
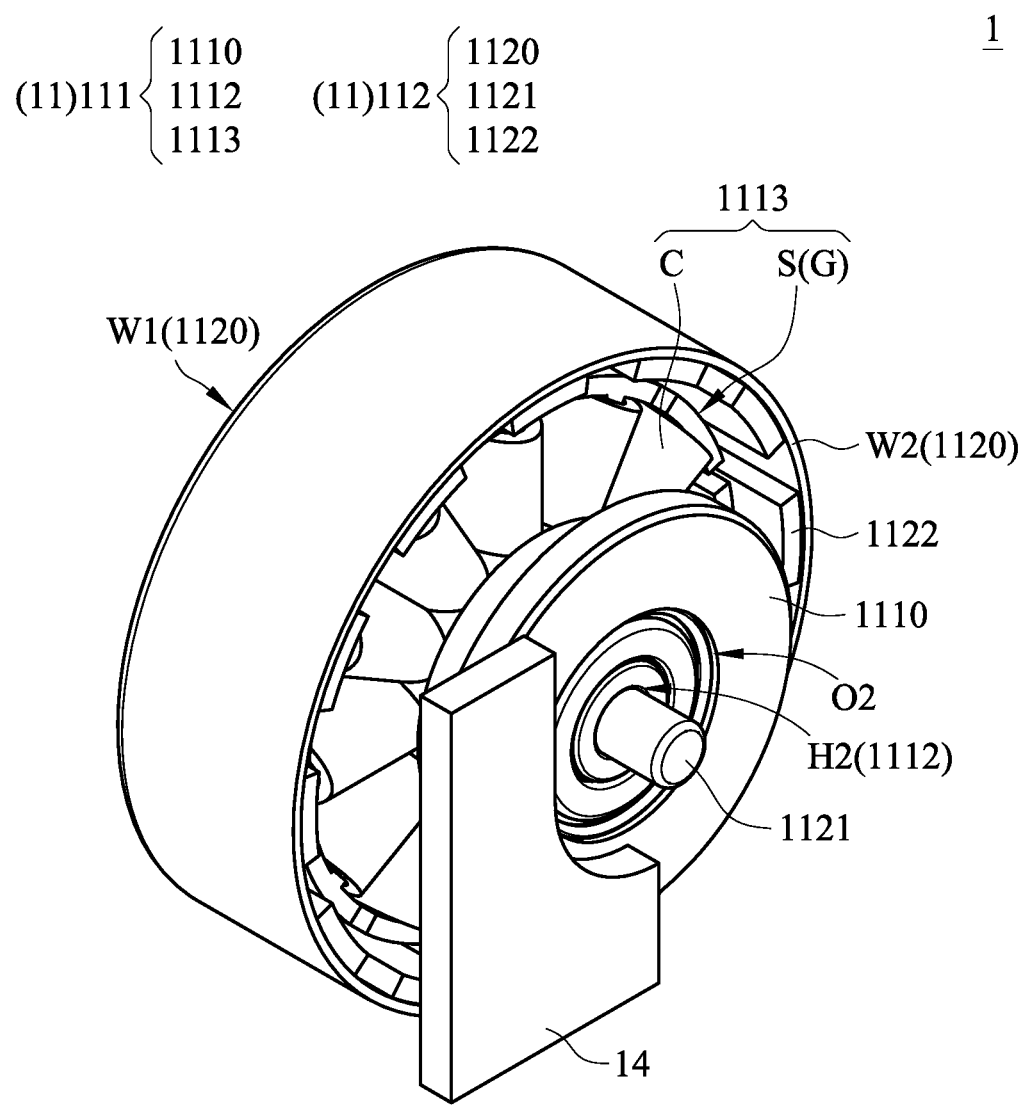
FIG. 1 is a schematic perspective view illustrating a mouse roller module according to an embodiment of the present invention.
Figure 2:
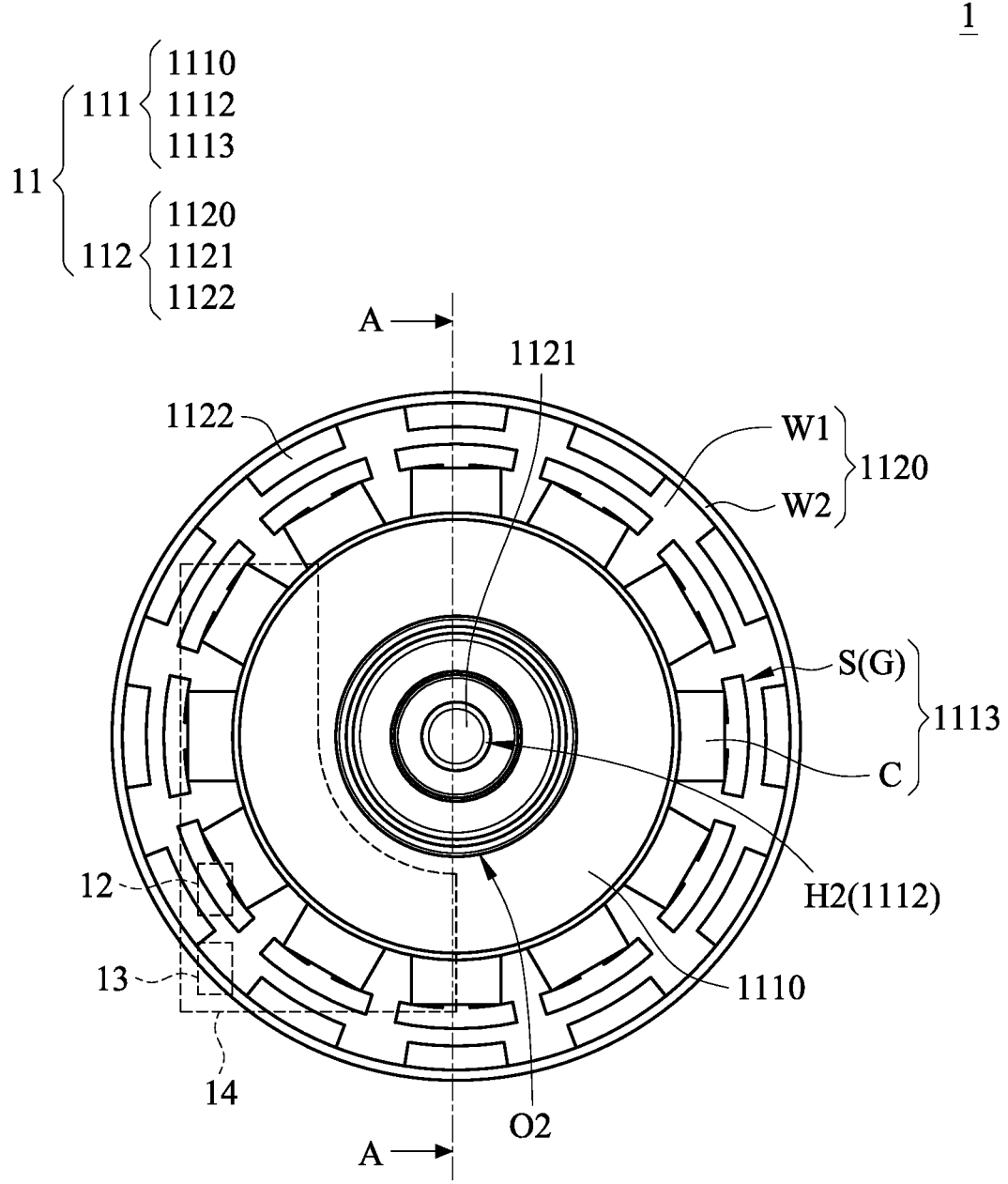
FIG. 2 is a schematic side view of the mouse roller module as shown in FIG. 1.
Figure 3:
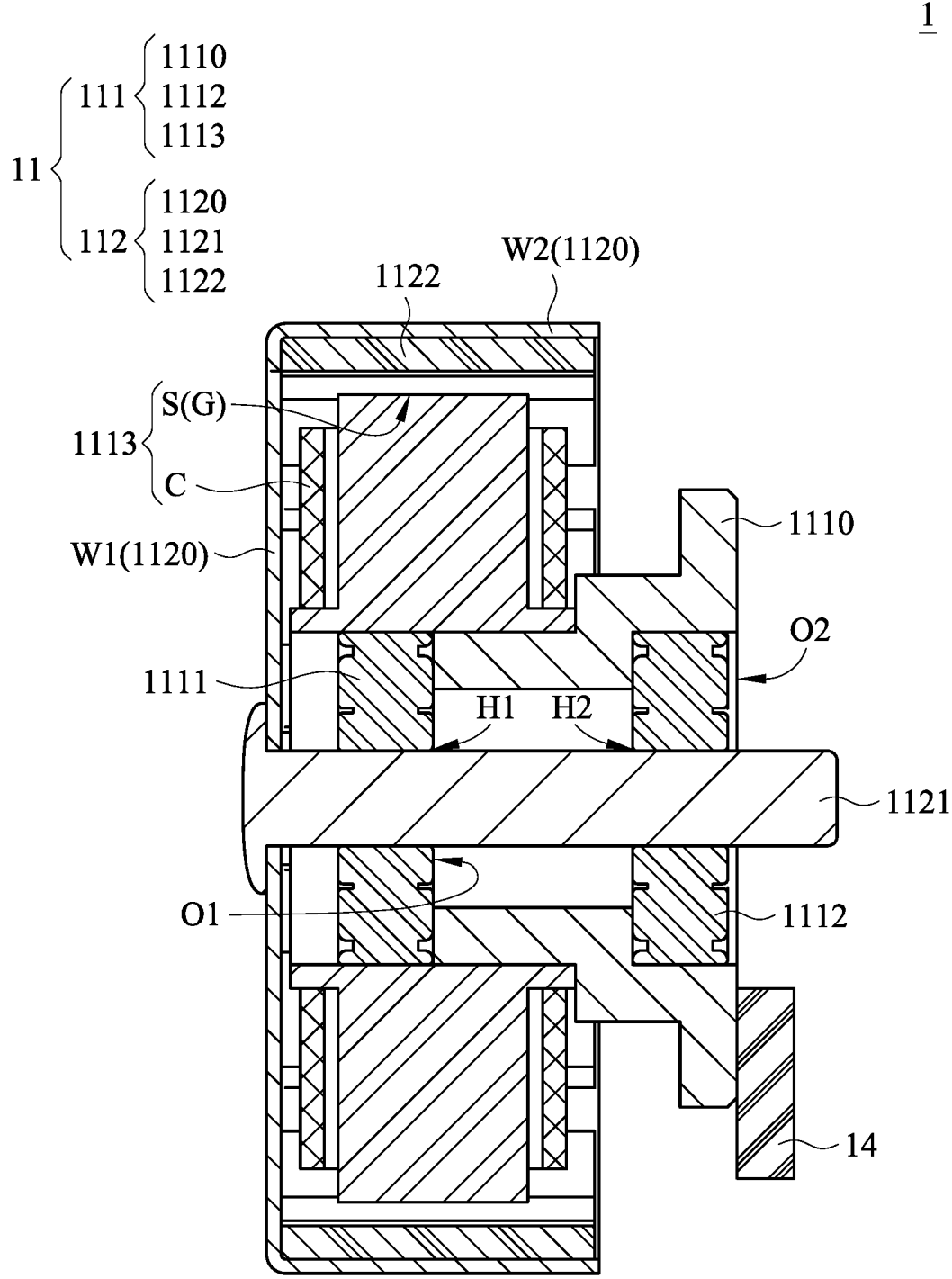
FIG. 3 is a schematic cross-sectional view of the mouse roller module as shown in FIG. 2 and taken along the line AA.
Figure 4:
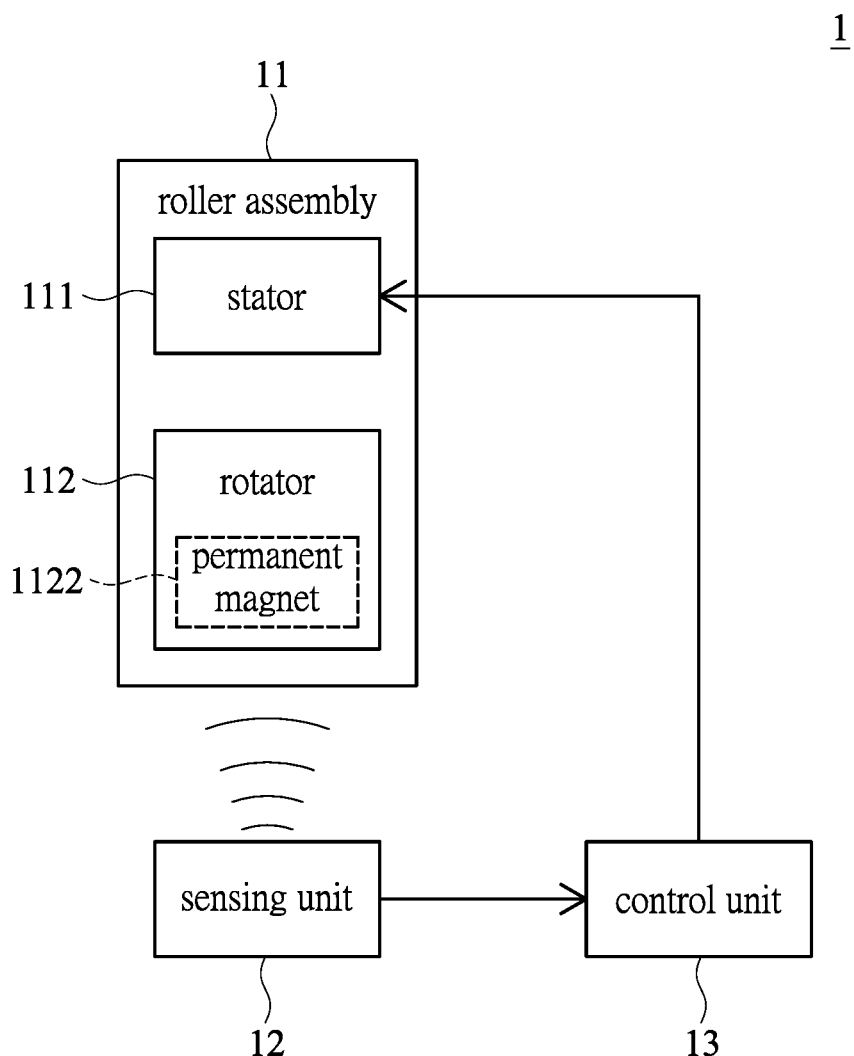
FIG. 4 is a schematic functional block diagram of the mouse roller module as shown in FIG. 1.

Please refer to FIGS. 1, 2, 3 and 4. FIG. 1 is a schematic perspective view illustrating a mouse roller module according to an embodiment of the present invention. FIG. 2 is a schematic side view of the mouse roller module as shown in FIG. 1. FIG. 3 is a schematic cross-sectional view of the mouse roller module as shown in FIG. 2 and taken along the line AA. FIG. 4 is a schematic functional block diagram of the mouse roller module as shown in FIG. 1. As shown in FIGS. 1, 2, 3 and 4, the mouse roller module 1 comprises a roller assembly 11, a sensing unit 12 and a control unit 13. The roller assembly 11 comprises a stator 111 and a rotator 112. The stator 111 is covered by a portion of the rotator 112. In other words, the roller assembly 11 has the structure an outer rotator motor. The sensing unit 12 is located beside the roller assembly 11. The control unit 13 is electrically connected with the roller assembly 11 and the sensing unit 12.

In a first usage mode, the rotator 112 of the roller assembly 11 is rotated relative to the stator 111 in response to an applied force of the user, and the rotating speed of the rotator 112 relative to the stator 111 is sensed by the sensing unit 12. When the control unit 13 judges that the rotating speed of the rotator 112 relative to the stator 111 reaches a threshold value, the roller assembly 11 is switched form the first usage mode to a second usage mode under control of the control unit 13. While the roller assembly 11 is switched form the first usage mode to the second usage mode, the roller assembly 11 is switched from a disabled state to an enabled state. Consequently, the stator 111 of the roller assembly 11 drives the rotation of the rotator 112.

In the first usage mode, the rotator 112 of the roller assembly 11 can be rotated by the user at a first rotating speed or a second rotating speed. The first rotating speed is a normal rotating speed. The second rotating speed is faster than the first rotating speed. If the control unit 13 judges that the second rotating speed reaches the threshold value, the roller assembly 11 is switched form the first usage mode to a second usage mode under control of the control unit 13. In the second usage mode, the roller assembly 11 is enabled. Under this circumstance, the stator 111 drives the rotation of the rotator 112 at the second rotating speed, or the stator 111 drives the rotation of the rotator 112 at a third rotating speed. The second rotating speed is faster than the first rotating speed. The third rotating speed is faster than the second rotating speed. It is noted that the rotating speed of the rotator 112 driven by the stator 111 in the second usage mode is not restricted. The rotating speed of the rotator 112 driven by the stator 111 may be increased or decreased according to the practical requirements.

The structure of the mouse roller module 1 will be described in more details as follows.

As shown in FIGS. 1, 2 and 3, the rotator 112 of the roller assembly 11 comprises an accommodation structure 1120, a rotating shaft 1121 and plural permanent magnets 1122. The accommodation structure 1120 comprises a bottom wall W1 and a lateral wall W2, which are connected with each other. The lateral wall W2 of the accommodation structure 1120 is protruded from the bottom wall W1. Consequently, an accommodation space is defined by the bottom wall W1 and the lateral wall W2. Since the outer side of the stator 111 is covered by the rotator 112, a portion of the stator 111 is disposed within the accommodation space of the accommodation structure 1120. The rotating shaft 1121 is installed on the bottom wall W1 of the accommodation structure 1120. In addition, the rotating shaft 1121 is extended from the bottom wall W1 of the accommodation structure 1120 in a direction toward the stator 111. The plural permanent magnets 1122 are discretely arranged and distributed on an inner surface of the lateral wall W2 of the accommodation structure 1120. That is, the plural permanent magnets 1122 are arranged around the rotating shaft 1121.

As shown in FIGS. 1, 2 and 3, the stator 111 of the roller assembly 11 comprises a housing 1110, a first bearing 1111 and a second bearing 1112. The housing 1110 comprises a first opening O1 and a second opening O2. The first opening O1 and the second opening O2 are opposed to each other. The first opening O1 of the housing 1110 is disposed within the accommodation structure 1120 of the rotator 112. That is, the first opening O1 of the housing 1110 is disposed within the accommodation space of the accommodation structure 1120. The second opening O2 of the housing 1110 is located outside the accommodation structure 1120 of the rotator 112. That is, the second opening O2 of the housing 1110 is located outside the accommodation space of the accommodation structure 1120. Moreover, the first opening O1 of the housing 1110 is arranged between the bottom wall W1 of the accommodation structure 1120 and the second opening O2. The first bearing 1111 is located at the first opening O1 of the housing 1110. That is, the first bearing 1111 is installed on the periphery of the first opening O1. The second bearing 1112 is located at the second opening O2 of the housing 1110. That is, the second bearing 1112 is installed in the second opening O2 of the housing 1110.

In this embodiment, the first bearing 1111 has a perforation H1, and the second bearing 1112 has a perforation H2. The perforation H1 of the first bearing 1111 is in communication with the first opening O1 of the housing 1110. The perforation H2 of the second bearing 1112 is in communication with the second opening O2 of the housing 1110. The rotating shaft 1121 of the rotator 112 is penetrated through the perforation H1 of the first bearing 1111, the first opening O1 of the housing 1110, the second opening O2 of the housing 1110 and the perforation H2 of the second bearing 1112 sequentially. Consequently, the stator 112 and the stator 111 are assembled with each other.

As shown in FIGS. 1, 2 and 3, the stator 111 of the roller assembly 11 further comprises a permeability structure 1113.

The permeability structure 1113 is circumferentially arranged on an outer surface of the housing 1110 and disposed within the accommodation structure 1120 of the rotator 112. The permeability structure 1113 comprises plural permeability units G and plural coil units C. The plural permeability units G are extended toward the lateral wall W2 of the accommodation structure 1120 and aligned with the corresponding permanent magnets 1122 on the lateral wall W2. Each permeability unit G has a permeability surface S that faces the permanent magnets 1122. The coil units C are wound around the corresponding permeability units G. Preferably but not exclusively, the permeability units G of the permeability structure 1113 are made of silicon steel.

As shown in FIGS. 1, 2 and 3, the mouse roller module 1 further comprises a circuit board 14. The circuit board 14 is installed on the stator 111 of the roller assembly 11. Moreover, the stator 111 is arranged between the rotator 112 and the circuit board 14. Particularly, the circuit board 14 is installed on the housing 111 of the stator 111, and the circuit board 14 is located near the second opening O2 of the housing 1110. In this embodiment, the sensing unit 12 and the control unit 13 are installed on the circuit board 14. It is noted that the installation position of the circuit board 14 is not restricted. As long as the magnetic fluxes of the permanent magnets 1122 of the stator 112 can be sensed by the sensing unit 12, the installation position of the circuit board 14 may be varied according to the practical requirements.

The operations of the mouse roller module 1 will be described with reference to FIGS. 1, 2, 3 and 4.

Firstly, the roller assembly 11 is in a first usage mode, and the user applies a force to the roller assembly 11. Consequently, the rotator 112 of the roller assembly 11 is rotated relative to the stator 111 at a first rotating speed (i.e., a normal rotating speed). At the same time, the sensing unit 12 continuously senses the rotating speed of the rotator 112 relative to the stator 111. Preferably but not exclusively, the sensing unit 12 is a Hall sensor. In an embodiment, the rotating speed sensed by the sensing unit 12 is obtained according to the number of permanent magnets 1122 of the stator 112 moving across the sensing unit 12 in a unit time period. Moreover, the sensing unit 12 generates a sensing signal corresponding to the rotating speed of the rotator 112. The sensing signal is transmitted from the sensing unit 12 to the control unit 13. According to the sensing signal, the control unit 13 judges whether the rotating speed reaches the threshold value.

If the control unit 13 judges that the rotating speed reaches the threshold value, the operation mode of the roller assembly 11 is switched to the second usage mode under control of the control unit 13. In the second usage mode, the roller assembly 11 is switched to the enabled state. Meanwhile, electric currents flow through the coil units C that are wound around the corresponding permeability units G of the stator 111. Consequently, alternating magnetic fields are generated between the permanent magnets 1122 of the stator 112 and the permeability surfaces S of the permeability units G of the stator 111. In response to the alternating magnetic fields, the rotator 112 is driven to rotate. Under this circumstance, even if the rotator 112 is not rotated by the user, the stator 111 drives the automatic rotation of the rotator 112. The rotating speed of the rotator 112 in the second usage mode is faster than the rotating speed of the rotator 112 in the first usage mode. In the second usage mode, the sensing unit 12 continuously senses the rotating speed of the rotator 112 relative to the stator 111. If the rotating speed of the rotator 112 is lower than the threshold value, for example the rotating speed of the rotator 12 is decreased because of the user's touch action, the operation mode of the roller assembly 11 is restored to the first usage mode under control of the control unit 13. While the second usage mode is switched to the first usage mode, the roller assembly 11 is switched from the enabled state to the disabled state.

Especially, when the roller assembly 11 is in the first usage mode, the permanent magnets 1122 of the rotator 112 and the corresponding permeability units G of the stator 111 face each other. Consequently, magnetic attractive forces are generated between the permanent magnets 1122 and the corresponding permeability units G. When the rotator 112 of the roller assembly 11 is rotated by the user in the first usage mode, the clear intermittent rotation feel is generated.

From the above descriptions, the present invention provides the mouse roller module. The roller assembly is an outer rotator motor composed of the stator and the rotator. When the roller assembly is in a first usage mode, the rotator is rotated relative to the stator in response to the applied force of the user and the rotating speed of the rotator relative to the stator is sensed by the sensing unit. If the rotating speed of the rotator relative to the stator reaches a threshold value, the roller assembly is switched form the first usage mode to a second usage mode under control of the control unit. While the first usage mode is switched to the second usage mode, the roller assembly is switched from a disabled state to an enabled state, so that the stator drives the rotation of the rotator. Moreover, since the permanent magnets of the rotator and the corresponding permeability units of the stator face each other, the rotation of the roller assembly results in clear intermittent rotation feel. In other words, the operating feed of rotating the roller assembly is enhanced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse roller module, comprising:
    a roller assembly comprising a stator and a rotator, wherein the stator is covered by the rotator, wherein when the roller assembly is in a first usage mode, the rotator is rotated relative to the stator in response to an applied force of a user,
        wherein the rotator comprises an accommodation structure, a rotating shaft and a plural permanent magnets, and the accommodation structure comprises a bottom wall and a lateral wall, which are connected with each other, wherein the rotating shaft is installed on the bottom wall, the plural permanent magnets are discretely arranged and distributed on an inner surface of the lateral wall, and the plural permanent magnets are arranged around the rotating shaft,
        wherein the stator comprises a housing, a first bearing and a second bearing, wherein the housing comprises a first opening and a second opening, and the first opening and the second opening are opposed to each other, wherein the first opening is disposed within the accommodation structure of the rotator, the second opening is located outside the accommodation structure of the rotator, the first opening is arranged between the bottom wall of the accommodation structure and the second opening, the first bearing is located at the first opening, the second bearing is located at the second opening, and the rotating shaft of the roller assembly is penetrated through the first bearing, the housing and the second bearing sequentially;

a sensing unit located beside the roller assembly, wherein a rotating speed of the rotator relative to the stator is sensed by the sensing unit; and a control unit electrically connected with the roller assembly and the sensing unit, wherein if the rotating speed of the rotator relative to the stator reaches a threshold value when the roller assembly is in the first usage mode, the roller assembly is switched form the first usage mode to a second usage mode under control of the control unit, wherein while the first usage mode is switched to the second usage mode, the roller assembly is switched from a disabled state to an enabled state, so that the stator drives rotation of the rotator.

2. The mouse roller module according to claim 1, wherein if the rotating speed of the rotator relative to the stator is lower than the threshold value when the roller assembly is in the second usage mode, the roller assembly is switched form the second usage mode to the first usage mode under control of the control unit, wherein while the second usage mode is switched to the first usage mode, the roller assembly is switched from the enabled state to the disabled state.

3. The mouse roller module according to claim 1, wherein the stator further comprises a permeability structure, and the permeability structure is circumferentially arranged on an outer surface of the housing and disposed within the accommodation structure of the rotator, wherein the permeability structure comprises plural permeability units and plural coil units, wherein the plural permeability units are extended toward the lateral wall of the accommodation structure and aligned with the corresponding permanent magnets, and the plural coil units are wound around the corresponding permeability units.

4. The mouse roller module according to claim 3, wherein each permeability unit has a permeability surface that faces the corresponding permanent magnet.

5. The mouse roller module according to claim 3, wherein the permeability units of the permeability structure are made of silicon steel.

6. The mouse roller module according to claim 1, wherein the sensing unit is a Hall sensor.

7. The mouse roller module according to claim 1, wherein the mouse roller module further comprises a circuit board, wherein the circuit board is installed on the stator of the roller assembly, the stator is arranged between the rotator and the circuit board, and the sensing unit and the control unit are installed on the circuit board.

* * * * *